United States Patent
Hasegawa

(10) Patent No.: US 12,275,487 B2
(45) Date of Patent: Apr. 15, 2025

(54) MOVING BODY

(71) Applicant: TOYOTA JIDOSHA KABUSHIKI KAISHA, Toyota (JP)

(72) Inventor: Koji Hasegawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 391 days.

(21) Appl. No.: 17/881,346

(22) Filed: Aug. 4, 2022

(65) Prior Publication Data

US 2023/0074147 A1 Mar. 9, 2023

(30) Foreign Application Priority Data

Sep. 3, 2021 (JP) .................................. 2021-143799

(51) Int. Cl.
| | |
|---|---|
| *B62K 27/00* | (2006.01) |
| *B62K 7/04* | (2006.01) |
| *B62K 13/04* | (2006.01) |
| *B62K 13/08* | (2006.01) |

(52) U.S. Cl.
CPC ................ *B62K 7/04* (2013.01); *B62K 13/04* (2013.01); *B62K 27/003* (2013.01); *B62K 13/08* (2013.01)

(58) Field of Classification Search
CPC ....... B62D 59/04; B62K 27/003; B62K 27/14
See application file for complete search history.

(56) References Cited

U.S. PATENT DOCUMENTS

| | | | | |
|---|---|---|---|---|
| 4,061,351 A | * | 12/1977 | Bangle ................ | A63C 17/015 403/234 |
| 5,127,488 A | * | 7/1992 | Shanahan .............. | A63C 17/12 180/181 |
| 6,250,656 B1 | * | 6/2001 | Ibarra .................... | B62K 3/002 280/87.041 |
| 7,140,621 B2 | * | 11/2006 | Cheng .................... | A63C 17/01 280/87.041 |
| 8,061,725 B1 | * | 11/2011 | Hawkins ................ | A63C 17/12 180/181 |
| 8,602,422 B2 | * | 12/2013 | Wilson ................. | A63C 17/006 280/11.27 |

(Continued)

FOREIGN PATENT DOCUMENTS

| | | |
|---|---|---|
| JP | 08-156791 A | 6/1996 |
| JP | 2009-012739 A | 1/2009 |

(Continued)

*Primary Examiner* — James A English
*Assistant Examiner* — Hosam Shabara
(74) *Attorney, Agent, or Firm* — Sughrue Mion, PLLC

(57) ABSTRACT

A moving body includes: a vehicle which includes a front wheel and rear wheels and which a passenger gets on; an unmanned carrier vehicle which is arranged at the back side of the vehicle, and includes a wheel and a driving unit which drives the wheel; and a coupler which couples the vehicle and the unmanned carrier vehicle. The coupler includes a biasing mechanism which biases a rear part of the vehicle toward an upper side of the vehicle, the biasing mechanism includes a first elastic member; when the passenger is on the vehicle, the first elastic member is deformed by the weight of the passenger to place the rear wheels in contact with a road surface, and when the passenger is not on the vehicle, the rear wheels are separated from the road surface by the elastic force of the first elastic member.

5 Claims, 9 Drawing Sheets

(56) References Cited

U.S. PATENT DOCUMENTS

| 11,033,801 | B2* | 6/2021 | Szymczak | B62M 13/00 |
| 11,305,830 | B2* | 4/2022 | Bartolotta | B62K 3/002 |
| 2005/0236803 | A1* | 10/2005 | Summers | B62K 5/05 |
| | | | | 280/282 |

FOREIGN PATENT DOCUMENTS

| JP | 2009-018609 A | 1/2009 |
| JP | 2016-020123 A | 2/2016 |

* cited by examiner

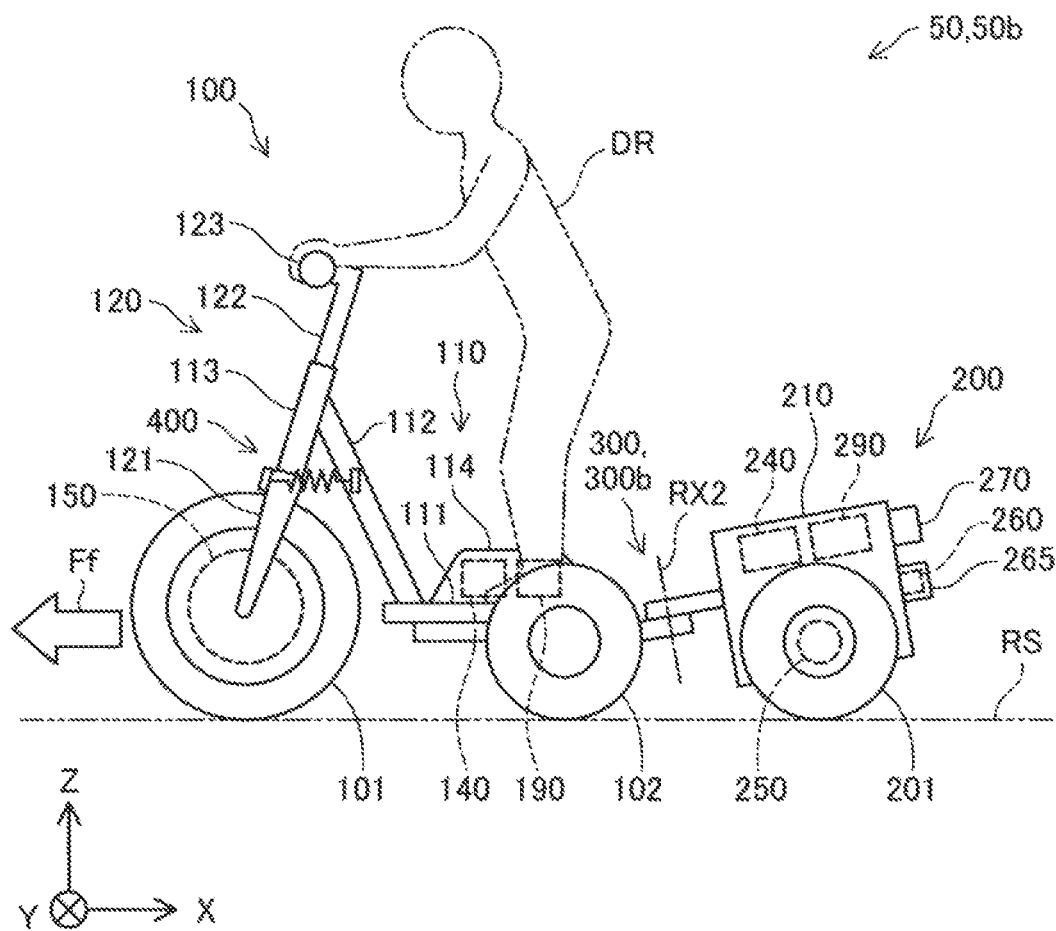

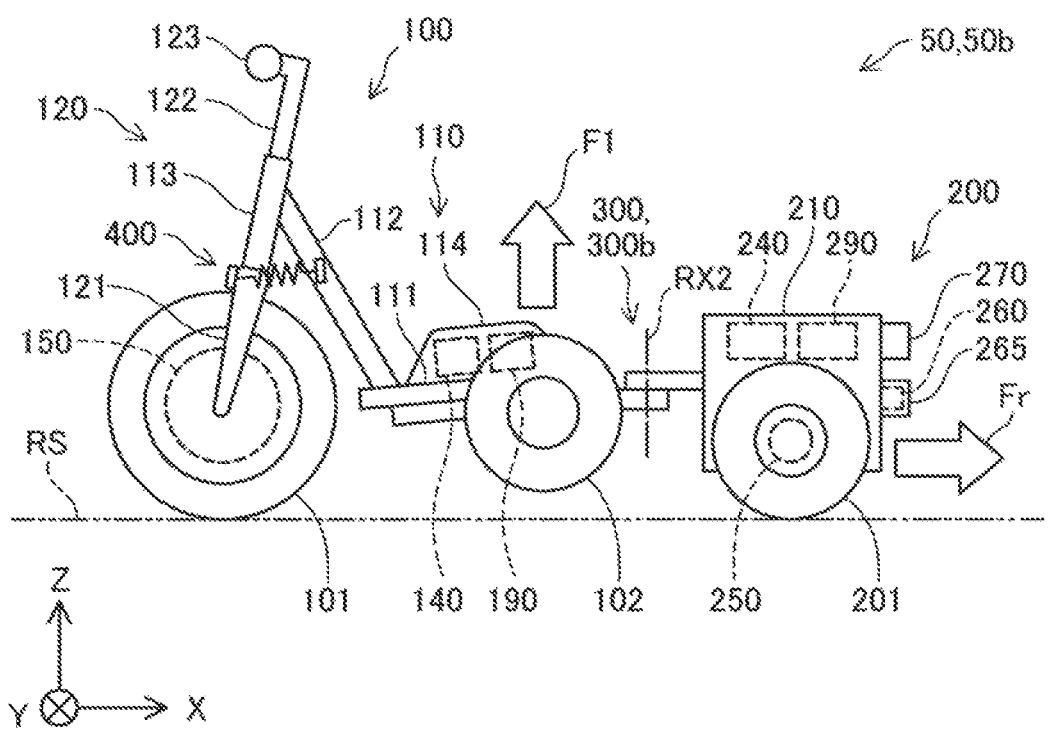

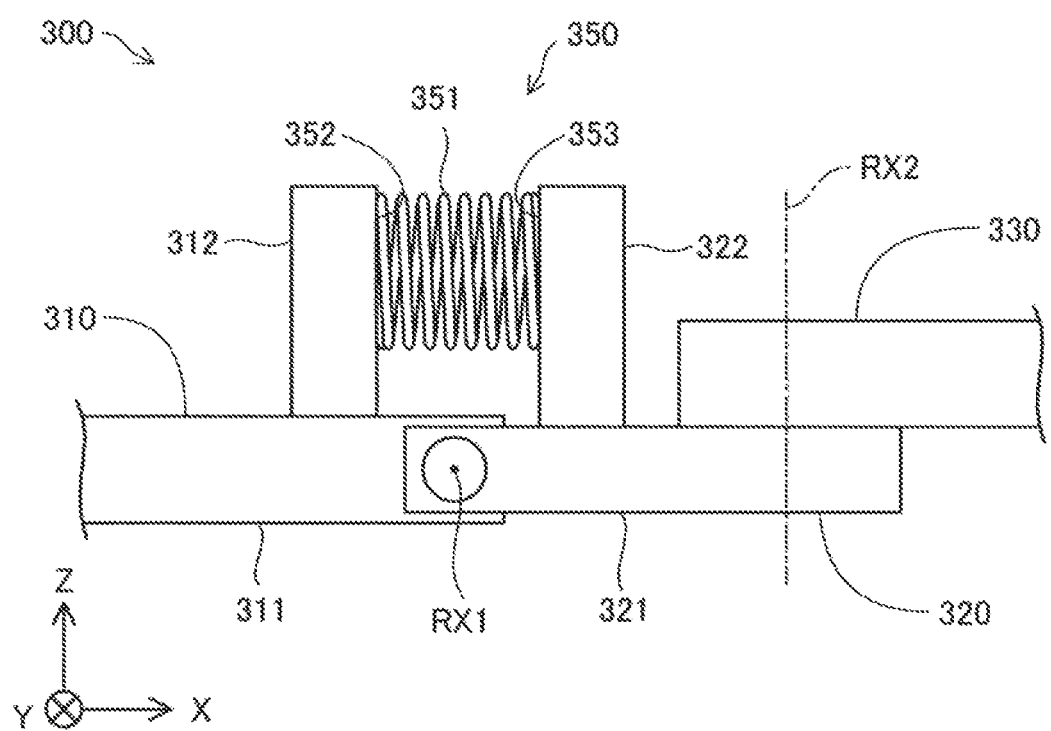

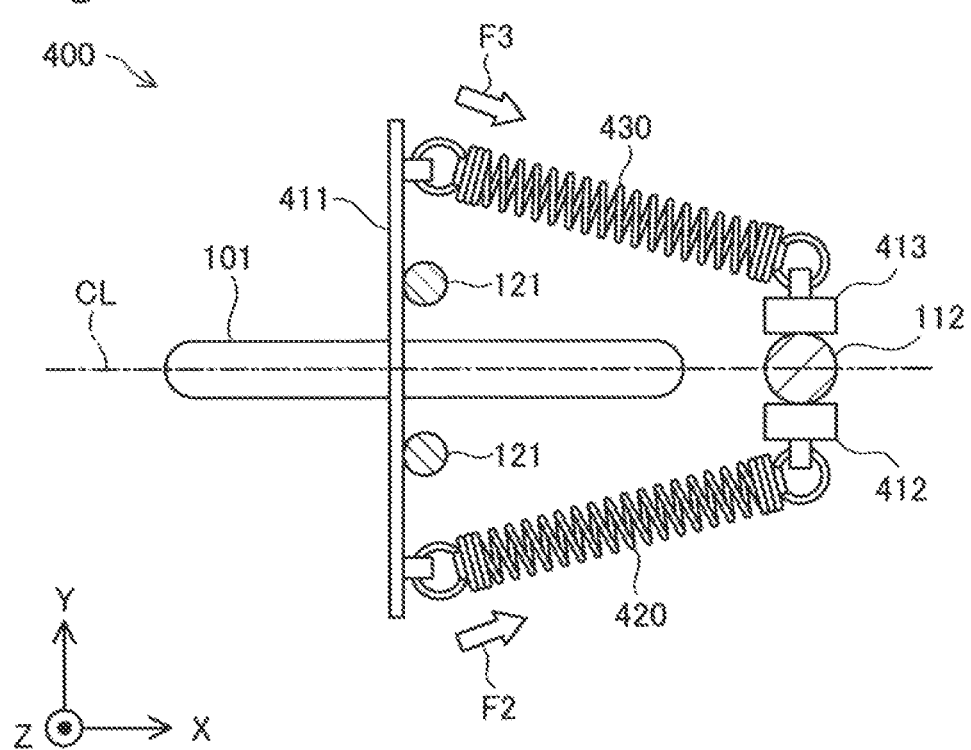

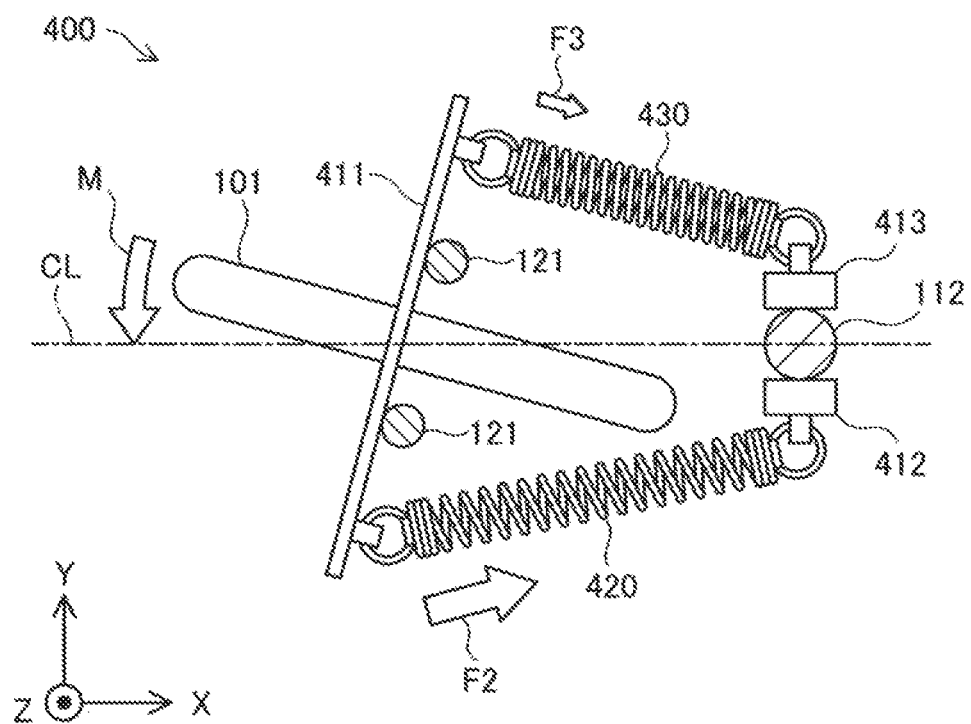

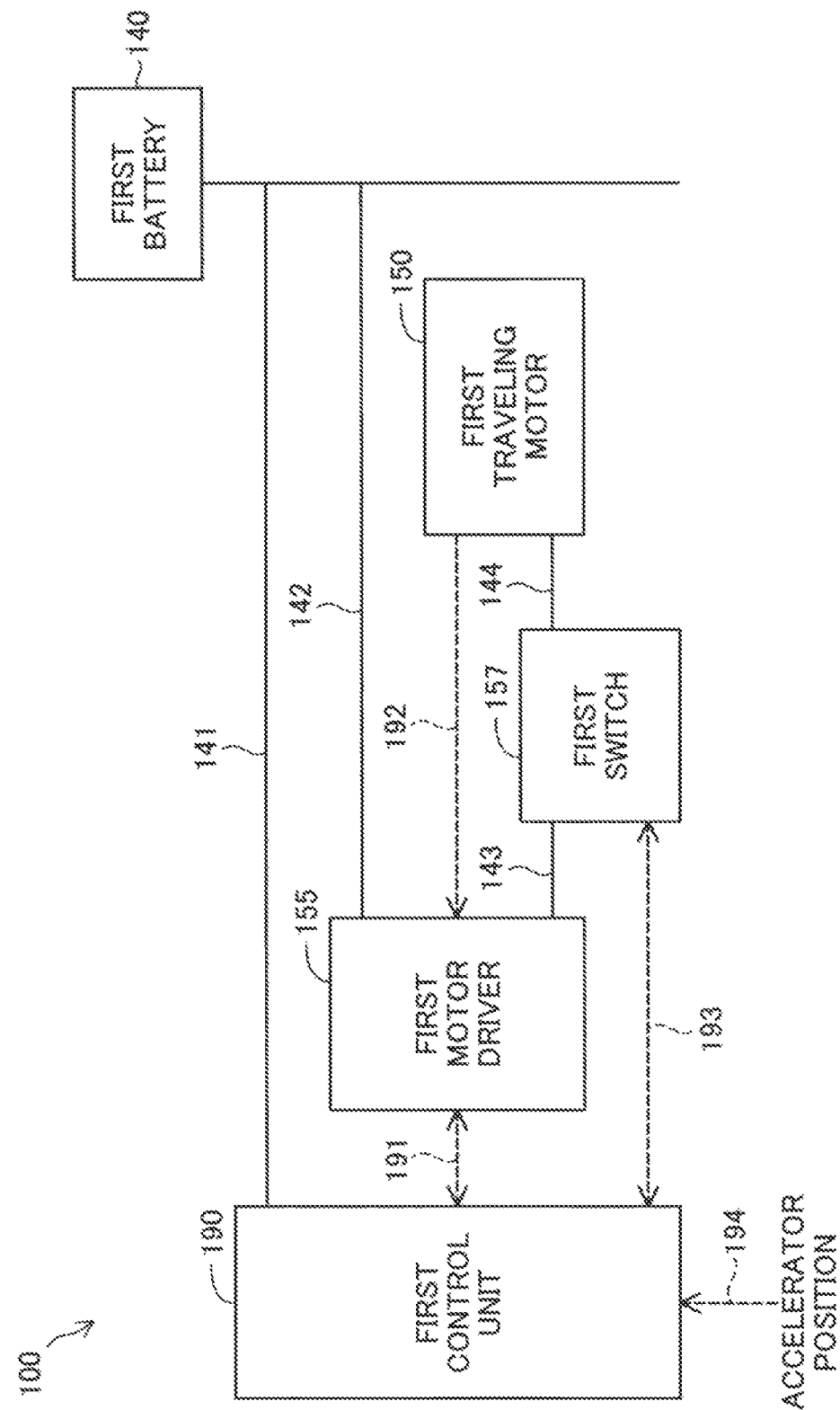

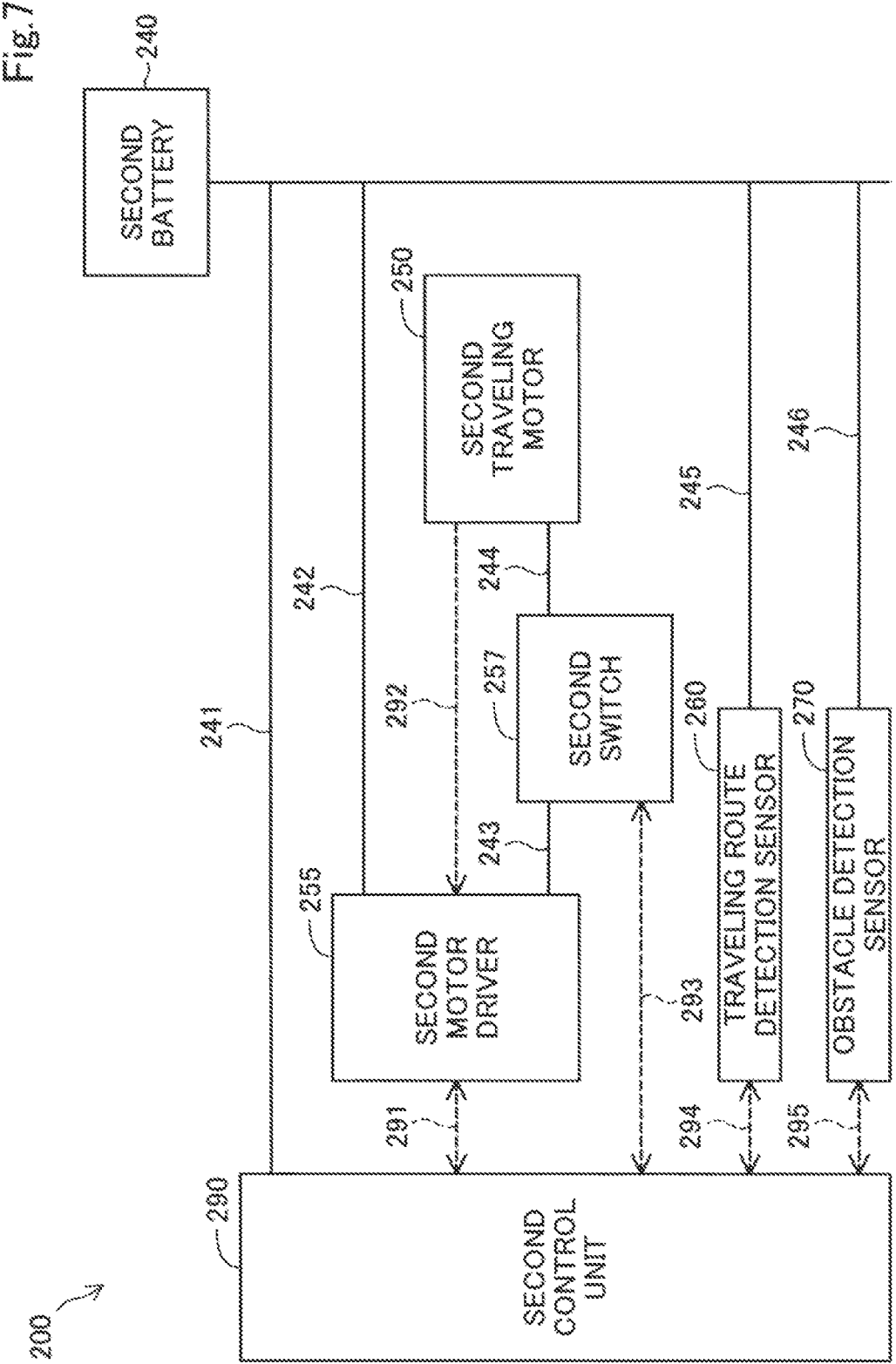

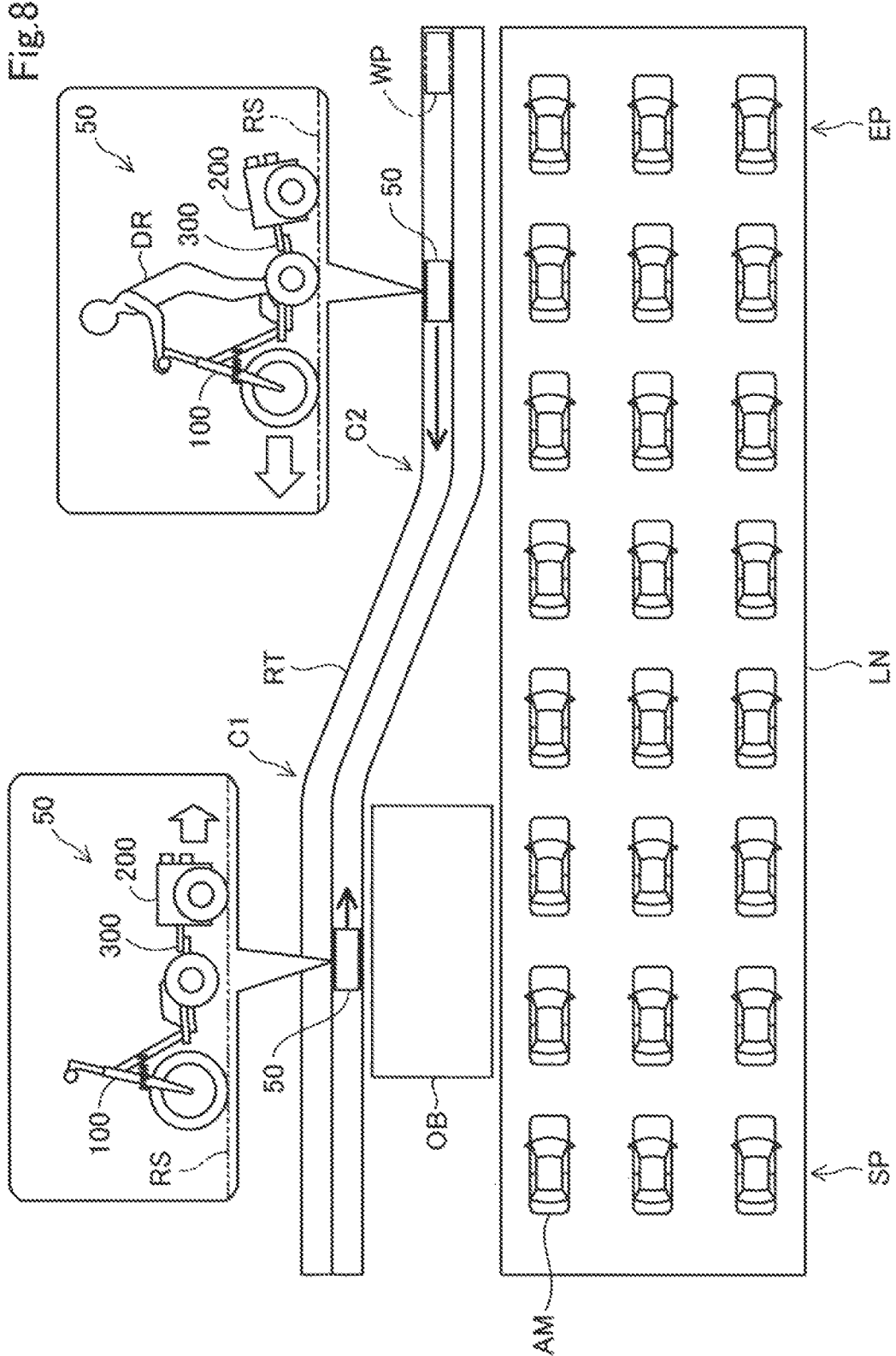

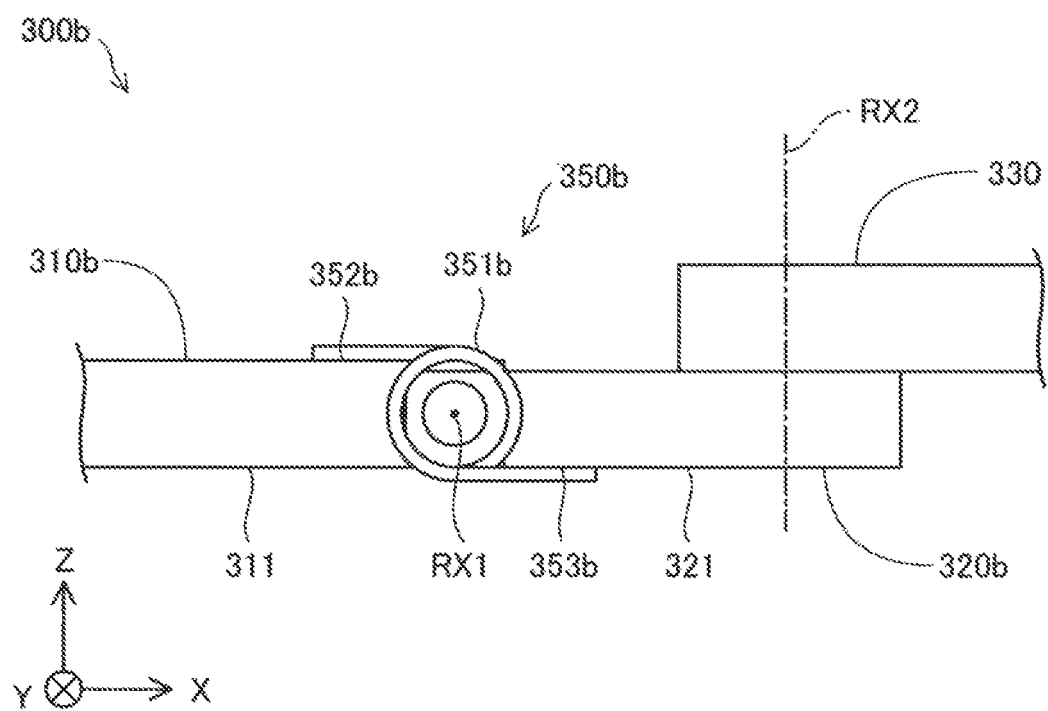

MOVING BODY

CROSS REFERENCE TO RELATED APPLICATIONS

This application claims priority to Japanese Patent Application No. 2021-143799, filed Sep. 3, 2021, the disclosure of which is incorporated by reference herein in its entirety.

BACKGROUND

Field

The present disclosure relates to a moving body.

Related Art

JP H8-156791A discloses an unmanned carrier vehicle which tows carts coupled by electromagnets.
Patent Literature 1: JP H8-156791 A When an unmanned carrier vehicle tows a vehicle backward in a state where a front wheel and rear wheels of the vehicle are in contact with a road surface, the friction force produced between the rear wheels and the road surface when the unmanned carrier vehicle turns a corner hinders cornering of the unmanned carrier vehicle.

SUMMARY

One aspect of the present disclosure provides a moving body. This moving body includes: a vehicle which includes a front wheel and rear wheels and which a passenger gets on; an unmanned carrier vehicle which is arranged at the back side of the vehicle and includes a wheel and a driving unit which drives the wheel; and a coupler which couples the vehicle and the unmanned carrier vehicle. The coupler includes a biasing mechanism which biases a rear part of the vehicle toward an upper side of the vehicle, the biasing mechanism includes a first elastic member; when the passenger is on the vehicle, the first elastic member is deformed by the weight of the passenger to place the rear wheels in contact with a road surface, and when the passenger is not on the vehicle, the rear wheels are separated from the road surface by the elastic force of the first elastic member.

BRIEF DESCRIPTION OF THE DRAWINGS

FIG. 1 is a first side view illustrating a schematic configuration of a moving body according to a first embodiment;

FIG. 2 is a second side view illustrating the schematic configuration of the moving body according to the first embodiment;

FIG. 3 is a side view illustrating a configuration of a coupler according to the first embodiment;

FIG. 4 is a first top view illustrating a configuration of a self-centering mechanism;

FIG. 5 is a second top view illustrating the configuration of the self-centering mechanism;

FIG. 6 is an explanatory view schematically illustrating an electrical configuration of a first vehicle according to the first embodiment;

FIG. 7 is an explanatory view schematically illustrating an electrical configuration of a second vehicle according to the first embodiment;

FIG. 8 is an explanatory view schematically illustrating how the moving body is used; and FIG. 9 is a side view illustrating a configuration of a coupler according to a second embodiment.

DETAILED DESCRIPTION

A. First Embodiment

FIG. 1 is a first side view illustrating a schematic configuration of a moving body 50 according to the first embodiment. FIG. 2 is a second side view illustrating the schematic configuration of the moving body 50 according to the first embodiment. FIGS. 1 and 2 illustrate arrows which indicate X, Y and Z axes which are three coordinate axes which are perpendicular to each other. The X axis is the coordinate axis which lies along a front-back direction of the moving body 50, the Y axis is the coordinate axis which lies along a left-right direction of the moving body 50, and the Z axis is the coordinate axis which lies along an up-down direction of the moving body 50. The arrows which indicate the X, Y and Z axes are illustrated in other figures, too, as appropriate such that directions indicated by the arrows correspond to those in FIGS. 1 and 2.

According to the present embodiment, as illustrated in FIG. 1, the moving body 50 includes a first vehicle 100, a second vehicle 200 and a coupler 300. The second vehicle 200 is arranged at the back side of the first vehicle 100. The first vehicle 100 and the second vehicle 200 are coupled to each other by the coupler 300.

According to the present embodiment, the first vehicle 100 is configured as a three-wheeled electric scooter which includes one front wheel 101 and a pair of left and right rear wheels 102. The front wheel 101 is arranged at a front end part of the moving body 50, and each rear wheel 102 is arranged between the front wheel 101 and the second vehicle 200. That is, the front-back direction of the first vehicle 100 is the same as the front-back direction of the moving body 50. The first vehicle 100 travels by operation of a passenger DR who is on the first vehicle 100. FIG. 1 illustrates the moving body 50 in a state where the passenger is on the first vehicle 100. FIG. 2 illustrates the moving body 50 in a state where the passenger DR is not on the first vehicle 100. As illustrated in FIG. 1, the first vehicle 100 can travel forward towing the second vehicle 200. In this regard, the first vehicle 100 may be configured as a three-wheeled electric scooter which includes a pair of left and right front wheels and one rear wheel, or may be configured as, for example, a four-wheeled electric cart which includes a pair of left and right front wheels and a pair of two left and right rear wheels instead of the three-wheeled electric scooter.

According to the present embodiment, in addition to the above-described front wheel 101 and rear wheels 102, the first vehicle 100 includes a first vehicle body part 110, a steering part 120, a self-centering mechanism 400, a first battery 140, a first traveling motor 150 and a first control unit 190.

The first vehicle body part 110 includes a step part 111, a main pipe 112, a head pipe 113 and a housing part 114. The step part 111 is arranged at a lower end part of the first vehicle body part 110. The passenger DR gets on the step part 111 while keeping a standing posture. A wheel shaft of the rear wheels 102 is connected to the step part 111. A lower end part of the main pipe 112 is fixed to a front end part of the step part 111. An upper end part of the main pipe 112 is arranged at a front side of the lower end of the main pipe 112. The head pipe 113 is fixed to the upper end part of the main pipe 112. The head pipe 113 is formed in a cylindrical shape which has a center axis along the up-down direction.

The housing part 114 is arranged at a center of the step part 111 in the left-right direction. The housing part 114 houses the first battery 140 and the first control unit 190.

The steering part 120 has a function of changing the traveling direction of the first vehicle 100. According to the present embodiment, the steering part 120 changes the direction of the front wheel 101 by turning about a turning axis along the up-down direction together with the front wheel 101. The steering part 120 includes a front fork 121, a steering column 122 and a handle part 123. Lower end parts of the front fork 121 are branched left and right, and the lower end parts of the front fork 121 are connected with a wheel shaft of the front wheel 101. According to the present embodiment, an upper end part of the front fork 121 is arranged at the back side of the lower end parts of the front fork 121 to give a caster angle to the front wheel 101. The steering column 122 is fixed to the upper end part of the front fork 121. A center part of the steering column 122 is arranged inside the head pipe 113, and is turnably supported by the head pipe 113. The handle part 123 is fixed to an upper end part of the steering column 122. The handle part 123 is provided with a handle for the passenger DR who is on the first vehicle 100 to grip. By turning the handle part 123 and changing the direction of the front wheel 101, the passenger DR can change the traveling direction of the first vehicle 100. In addition, according to the present embodiment, the rear wheels 102 are configured as fixed wheels.

According to the present embodiment, a handle on a right side of the handle part 123 is configured as an accelerator lever. The accelerator lever is used to perform an operation of accelerating the first vehicle 100. The handle part 123 is provided with a brake lever. The first vehicle 100 is provided with an unillustrated friction brake, and the brake lever is used to perform an operation of actuating the friction brake and decelerating the first vehicle 100.

The self-centering mechanism 400 biases the front wheel 101 to turn the direction of the front wheel 101 toward the front side of the first vehicle 100. By turning the handle part 123 against the self-centering mechanism 400, the passenger DR can turn the direction of the front wheel 101 toward a side other than the front side. A specific configuration of the self-centering mechanism 400 will be described later.

As the first battery 140, for example, secondary batteries such as a lead-acid battery, a lithium ion secondary battery and a nickel metal hydride battery can be used. In addition, instead of the secondary battery, a primary battery may be used for the first battery 140.

The first traveling motor 150 generates a driving force Ff for causing the first vehicle 100 to travel by using the first battery 140 as a power supply. According to the present embodiment, the first traveling motor 150 causes the front vehicle 101 to travel by rotating the front wheel 101. According to the present embodiment, the first traveling motor 150 is configured as an in-wheel motor provided in the front wheel 101. The first traveling motor 150 is driven under control of the first control unit 190. In addition, the first traveling motor 150 may cause the first vehicle 100 to travel by rotating the rear wheels 102. The first traveling motor 150 may not be configured as the in-wheel motor. In a case where the first traveling motor 150 is not configured as the in-wheel motor, the first traveling motor 150 may be provided inside the housing part 114, for example.

The first control unit 190 is configured as a computer which includes a CPU, a memory and an input/output interface. According to the present embodiment, the first control unit 190 causes the first vehicle 100 to travel by controlling the first traveling motor 150 according to an accelerator position of the accelerator lever. The first vehicle 100 travels forward towing the second vehicle 200 in a state where the passenger DR is on the first vehicle 100. According to the present embodiment, the first vehicle 100 can travel 20 kilometers per hour. In addition, the first control unit 190 may be configured as a combination of a plurality of circuits instead of the computer.

As illustrated in FIG. 2, the second vehicle 200 is configured as an unmanned carrier vehicle. The unmanned carrier vehicle means not only an Automated Guided Vehicle (AGV) which travels by automatic driving along a predetermined traveling route, but also an Autonomous Mobile Robot (AMR) which travels by automatic driving along a traveling route determined by the AMR. According to the present embodiment, the second vehicle 200 is configured as a two-wheeled unmanned carrier vehicle which includes a pair of left and right wheels 201. In this regard, instead of the two-wheeled unmanned carrier vehicle, the second vehicle 200 may be configured as, for example, a one-wheeled unmanned carrier vehicle or a four-wheeled unmanned carrier vehicle which includes a pair of left and right front wheels and a pair of left and right rear wheels.

According to the present embodiment, in addition to the above-described wheels 201, the second vehicle 200 includes a second vehicle body part 210, a second battery 240, second traveling motors 250, a traveling route detection sensor 260, an obstacle detection sensor 270 and a second control unit 290. In addition, the second traveling motors 250 are referred to as driving units in some cases.

According to the present embodiment, the second vehicle body part 210 is formed in a box shape. The second vehicle body part 210 is connected with a wheel shaft of the wheels 201. The second battery 240 and the second control unit 290 are housed inside the second vehicle body part 210.

As the second battery 240, for example, secondary batteries such as a lead-acid battery, a lithium ion secondary battery and a nickel metal hydride battery can be used. In addition, instead of the secondary battery, a primary battery may be used as the second battery 240.

The second traveling motors 250 generate a driving force Fr for causing the second vehicle 200 to travel by using the second battery 240 as a power supply. According to the present embodiment, the second traveling motors 250 cause the vehicle 200 to travel by rotating the wheels 201. According to the present embodiment, the second traveling motors 250 are configured as in-wheel motors provided in the wheels 201, and are provided in each of the left and right wheels 201. The second traveling motors 250 are driven under control of the second control unit 290. In addition, the second traveling motors 250 may not be configured as the in-wheel motors. In this case, the second traveling motors 250 may be provided inside the second vehicle body part 210, for example.

The traveling route detection sensor 260 is a sensor which detects a traveling route of the second vehicle 200. According to the present embodiment, the traveling route detection sensor 260 is an image sensor which is built in a camera 265 provided at a rear end part of the second vehicle body part 210. The traveling route detection sensor 260 detects a mark which indicates the traveling route provided on a road surface RS. The traveling route detection sensor 260 is built in the camera 265 fixed to the rear end part of the second vehicle body part 210. An output signal from the traveling route detection sensor 260 is transmitted to the second control unit 290.

The obstacle detection sensor 270 is a sensor which detects obstacles on the traveling route of the second vehicle

200. According to the present embodiment, the obstacle detection sensor 270 is a laser range scanner which detects obstacles in a predetermined area whose center is the obstacle detection sensor 270. The obstacle detection sensor 270 is provided at the rear end part of the second vehicle body part 210. An output signal from the obstacle detection sensor 270 is transmitted to the second control unit 290.

The second control unit 290 is configured as a computer which includes a CPU, a memory and an input/output interface. According to the present embodiment, the second control unit 290 causes the second vehicle 200 to travel by controlling the second traveling motors 250. The second vehicle 200 travels backward towing the first vehicle 100 in a state where the passenger DR is not on the first vehicle 100. According to the present embodiment, the second vehicle 200 can travel 7 kilometers per hour. By controlling the left and right second traveling motors 250 and varying rotational speeds between the left and right wheels 201, the second control unit 290 can change the traveling direction of the second vehicle 200. The second control unit 290 can decelerate the second vehicle 200 by regenerative brakes which use the second traveling motors 250 or electromagnetic brakes of an excitation system which use the second traveling motors 250. The second control unit 290 causes the second vehicle 200 to travel along the traveling route while detecting the traveling route by analyzing an image generated by using the output signal from the traveling route detection sensor 260. When the obstacle detection sensor 270 detects an obstacle on the traveling route, the second control unit 290 causes the second vehicle 200 to detour so as to avoid contact with the obstacle. In addition, the second control unit 290 may be configured as a combination of a plurality of circuits instead of the computer.

FIG. 3 is a side view illustrating a configuration of the coupler 300 according to the present embodiment. According to the present embodiment, the coupler 300 includes a first coupling part 310, a second coupling part 320, a third coupling part 330 and a biasing mechanism 350. The first coupling part 310, the second coupling part 320 and the third coupling part 330 of the coupler 300 are arranged from the front side to the back side in this order.

A front end part of the first coupling part 310 is fixed to a rear end part of the step part 111. According to the present embodiment, the first coupling part 310 includes a first plate part 311 which is provided along the front-back direction, and a first wall part 312 which protrudes upward from the first plate part 311. A connection part of the first coupling part 310 with respect to the step part 111 is provided on the first plate part 311.

The second coupling part 320 is connected to the first coupling part 310 rotatably about a rotary shaft RX1 along the left-right direction with respect to the first coupling part 310. According to the present embodiment, the second coupling part 320 includes a second plate part 321 which is provided along the front-back direction, and a second wall part 322 which protrudes upward from the second plate part 321. A connection part of the second coupling part 320 with respect to the first coupling part 310 is provided on the second plate part 321.

The third coupling part 330 is connected to the second coupling part 320 rotatably about a rotary shaft RX 2 along the up-down direction with respect to the second coupling part 320. A rear end part of the third coupling part 330 is fixed to a front end part of the second vehicle body part 210. That is, the third coupling part 330 connects the second coupling part 320 to the second vehicle body part 210.

The biasing mechanism 350 biases a rear part of the first vehicle 100 upward. The biasing mechanism 350 includes a first elastic member 351, a first support part 352 and a second support part 353. In the present embodiment, the first elastic member 351 is arranged between the first wall part 312 and the second wall part 322. The first elastic member 351 extends and contracts along the front-back direction. According to the present embodiment, the first elastic member 351 is configured as a helical coil spring.

The first support part 352 supports a front end part of the first elastic member 351. According to the present embodiment, the first support part 352 is provided on the first wall part 312. The front end part of the first elastic member 351 is fixed to the first support part 352. The second support part 353 supports a rear end part of the first elastic member 351. According to the present embodiment, the second support part 353 is provided on the second wall part 322. The rear end part of the first elastic member 351 is fixed to the second support part 353.

By relatively rotating the second coupling part 320 with respect to the first coupling part 310 by deformation of the first elastic member 351, the biasing mechanism 350 switches between a state where the rear wheels 102 are in contact with the road surface RS and a state where the rear wheels 102 are apart from the road surface RS. When the passenger DR is on the first vehicle 100 as illustrated in FIG. 1, the biasing mechanism 350 deforms the first elastic member 351 by the weight of the passenger DR, and places the rear wheels 102 in contact with the road surface RS. When the passenger DR is not on the first vehicle 100 as illustrated in FIG. 2, the biasing mechanism 350 separates the rear wheels 102 from the road surface RS by the elastic force of the first elastic member 351. The force F1 of the biasing mechanism 350 for lifting the rear part of the first vehicle 100 is greater than the rear axle load of the first vehicle 100. The rear axle load of the first vehicle 100 means a weight which is part of the weight of the first vehicle 100 and is applied from the rear wheels 102 to the road surface RS. In a case where the first vehicle 100 includes the two rear wheels 102 as in the present embodiment, the rear axle load of the first vehicle 100 is the sum of weights to be applied from each rear wheel 102 to the road surface RS. The force F1 of the biasing mechanism 350 for lifting the rear part of the first vehicle 100 is less than the sum of the rear axle load of the first vehicle 100, and the weights which are part of a weight determined in advance as the weight of the passenger DR and applied from the rear wheels 102 to the road surface RS.

FIG. 4 is a first top view illustrating a configuration of the self-centering mechanism 400 provided on the first vehicle 100. FIG. 5 is a second top view illustrating the configuration of the self-centering mechanism 400. FIGS. 4 and 5 illustrate the front wheel 101, cross sections of the front fork 121 and a cross section of the main pipe 112 together with the self-centering mechanism 400. As illustrated in FIG. 4, the self-centering mechanism 400 includes a first bracket 411, a second bracket 412, a third bracket 413, a second elastic member 420 and a third elastic member 430.

The first bracket 411 is arranged at the front side of the front fork 121. According to the present embodiment, the first bracket 411 is provided along the left-right direction. A left end part of the first bracket 411 is arranged in a left direction of the front fork 121, and a right end part of the first bracket 411 is arranged in a right direction of the front fork 121. The first bracket 411 is fixed to the front fork 121 by, for example, screws or welding. In this regard, the first bracket 411 may be arranged at the back side of the front fork 121. The first bracket 411 may be fixed to the steering column 122 instead of the front fork 121.

The second bracket 412 is arranged on the left side surface of the main pipe 112. The third bracket 413 is arranged on the right side of the main pipe 112. The second bracket 412 and the third bracket 413 are fixed to the main pipe 112 by, for example, screws or welding.

The second elastic member 420 is arranged between the first bracket 411 and the second bracket 412. The third elastic member 430 is arranged between the first bracket 411 and the third bracket 413. The second elastic member 420 and the third elastic member 430 extend and contract along the front-back direction. According to the present embodiment, the second elastic member 420 and the third elastic member 430 are configured as helical tension springs. The third elastic member 430 is configured as a helical coil spring of the same type as that of the second elastic member 420. That is, a spring constant of the third elastic member 430 is the same as a spring constant of the second elastic member 420. The second elastic member 420 and the third elastic member 430 are provided symmetrically around the front wheel 101. A front end part of the second elastic member 420 is connected to the left end part of the first bracket 411, and is supported by the first bracket 411. A rear end part of the second elastic member 420 is connected to the second bracket 412, and is supported by the second bracket 412. A front end part of the third elastic member 430 is connected to a right end part of the first bracket 411, and is supported by the first bracket 411. A rear end part of the third elastic member 430 is connected to the third bracket 413, and is supported by the third bracket 413.

When the front wheel 101 faces forward, that is, when a tread surface of the front wheel 101 is arranged along the central axis CL of the first vehicle 100 parallel to the front-back direction as illustrated in FIG. 4, the length of the second elastic member 420 is longer than the equilibrium length of the second elastic member 420, and the length of the third elastic member 430 is longer than the equilibrium length of the third elastic member 430. When the direction of the front wheel 101 faces forward, the moment of force applied to the front wheel 101 by the elastic force F2 of the second elastic member 420 and the moment of force applied to the front wheel 101 by the elastic force F3 of the third elastic member 430 are balanced.

When the front wheel 101 rotates clockwise seen from the upper side and then the direction of the front wheel 101 deviates from the front side as illustrated in FIG. 5, the second elastic member 420 is pulled by the first bracket 411 and extends, the third elastic member 430 contracts, and therefore the elastic force F2 of the second elastic member 420 becomes greater than the elastic force F3 of the third elastic member 430. That is, the moment of force applied to the front wheel 101 by the elastic force F2 of the second elastic member 420 becomes greater than the moment of force applied to the front wheel 101 by the elastic force F3 of the third elastic member 430. Hence, the front wheel 101 is pulled back by a resultant moment M obtained by synthesizing the moment of force of the elastic force F2 of the second elastic member 420 and the moment of force of the elastic force F3 of the third elastic member 430 to face forward.

When the front wheel 101 rotates counterclockwise seen from the upper side and then the direction of the front wheel 101 deviates from the front side, the elastic force F3 of the third elastic member 430 becomes greater than the elastic force F2 of the second elastic member 420, and therefore the front wheel 101 is pulled back by the resultant moment M of a direction opposite to the direction illustrated in FIG. 5 to face forward.

FIG. 6 is an explanatory view schematically illustrating an electrical configuration of the first vehicle 100. FIG. 6 illustrates power cables 141 to 144 which connect each unit of the first vehicle 100 as solid lines, and signal cables 191 to 194 which connect each unit of the first vehicle 100 as broken lines. According to the present embodiment, the first traveling motor 150 receives a supply of electric power from the first battery 140 via a first motor driver 155. The first motor driver 155 supplies electric power for driving the first traveling motor 150 to the first traveling motor 150 under control of the first control unit 190. A first switch 157 which switches on and off the electrical connection between the first motor driver 155 and the first traveling motor 150 is provided between the first motor driver 155 and the first traveling motor 150. According to the present embodiment, the first switch 157 is configured as an electromagnetic switch which is driven under control of the first control unit 190. When the second vehicle 200 is traveling towing the first vehicle 100, that is, when an instruction signal for driving the first traveling motor 150 is not output from the first control unit 190, the first control unit 190 causes the first switch 157 to switch off the electrical connection between the first motor driver 155 and the first traveling motor 150.

FIG. 7 is an explanatory view schematically illustrating an electrical configuration of the second vehicle 200. FIG. 7 illustrates power cables 241 to 246 which connect each unit of the second vehicle 200 as solid lines, and signal cables 291 to 295 which connect each unit of the second vehicle 200 as broken lines. According to the present embodiment, the second traveling motor 250 receives a supply of electric power from the second battery 240 via a second motor driver 255. The second motor driver 255 supplies electric power for driving the second traveling motors 250 to the second traveling motor 250 under control of the second control unit 290. Second switches 257 which switch on and off the electrical connection between the second motor drivers 255 and the second traveling motors 250 are provided between the second motor drivers 255 and the second traveling motors 250. According to the present embodiment, the second switch 257 is configured as an electromagnetic switch which is driven under control of the second control unit 290. When the first vehicle 100 is traveling towing the second vehicle 200 by operation of the passenger DR, that is, when an instruction signal for driving the second traveling motors 250 is not output from the second control unit 290, the second control unit 290 causes the second switches 257 to switch off the electrical connection between the second motor drivers 255 and the second traveling motors 250. Note that the second vehicle 200 is provided with a pair of left and right second traveling motors 250, a pair of left and right second motor drivers 255, and a pair of left and right second switches 257. FIG. 7 illustrates one of the left and right second traveling motors 250, one of the left and right second motor drivers 255 and one of the left and right second switches 257 for ease of understanding the technique, and omits illustration of the other one of the left and right second traveling motors 250, the other one of the left and right second motor drivers 255 and the other one of the left and right second switches 257.

FIG. 8 is an explanatory view schematically illustrating how the moving body 50 according to the present embodiment is used. FIG. 8 illustrates how the moving body 50 is used in a manufacturing factory of an automobile AM as an example. More specifically, FIG. 8 illustrates how the moving body 50 is used by an inspector to move on a route RT provided along an inspection line LN of the automobile AM. The inspection line LN is linearly provided. For example, surrounding equipment OB such as a shelf or a device is arranged between the inspection line LN and the route RT, and the route RT is provided in an S shape so as to avoid the peripheral equipment OB. The route RT includes two corners C1 and C2. The inspector gets on the inspection target automobile AM at a start point SP of the inspection line LN, and moves to an end point EP of the inspection line LN together with the automobile AM while inspecting the automobile AM. The inspector who has arrived at the end point EP returns to the start point SP along the route RT. A waiting place WP of the moving body 50 is provided near the end point EP of the inspection line LN. The inspector who has arrived at the end point EP changes from the automobile AM to the first vehicle 100 of the moving body 50, drives the first vehicle 100 which travels towing the second vehicle 200, and returns to the start point SP. After the inspector gets off the first vehicle 100, the second vehicle 200 automatically travels towing the first vehicle 100, and returns to the waiting place WP. In this example, it is possible to reduce the time taken by the inspector to return from the end point EP to the start point SP compared to when the inspector moves on foot on the route RT, so that it is possible to decrease the number of inspectors assigned to the inspection line LN. In addition, in another example, the moving body 50 may be used in an urban area. For example, a user may drive the first vehicle 100 which travels towing the second vehicle 200 to move from home to a railway station or a bus stop, and, after the user gets off the first vehicle 100, the second vehicle 200 may automatically travel and return to the user's home towing the first vehicle 100.

According to the above-described moving body 50 according to the present embodiment, the biasing mechanism 350 places the rear wheels 102 in contact with the road surface RS by the weight of the passenger DR while the passenger DR is on the first vehicle 100 as illustrated in FIG. 1, so that it is possible to stabilize the position of the first vehicle 100, on which the passenger DR is onboard, travels towing the second vehicle 200. Furthermore, the biasing mechanism 350 separates the rear wheels 102 from the road surface RS when the passenger DR is not on the first vehicle 100 as illustrated in FIG. 2, so that, when the second vehicle 200 travels towing the first vehicle 100 on which the passenger DR is not onboard, it is possible to prevent the friction force applied to the rear wheels 102 from the road surface RS from hindering cornering of the second vehicle 200.

Furthermore, according to the present embodiment, the biasing mechanism 350 switches between a state where the rear wheels 102 are in contact with the road surface RS and a state where the rear wheels 102 are apart from the road surface RS by using the first elastic member 351 and without using a hydraulic system or a motor. Consequently, a simple configuration makes it possible to automatically switch between the state where the rear wheels 102 are in contact with the road surface RS and the state where the rear wheels 102 are apart from the road surface RS in response to the passenger DR's getting on and off the first vehicle 100. According to the present embodiment in particular, when the first vehicle 100 travels towing the second vehicle 200, the rear part of the first vehicle 100 is urged upward by the biasing mechanism 350, and therefore the front wheel 101 which is a driving wheel is strongly firmly pressed against the road surface RS compared to a mode that the rear part of the first vehicle 100 is not urged upward. Consequently, it is possible to prevent wheel spin of the front wheel 101 when the first vehicle 100 travels towing the second vehicle 200.

Furthermore, according to the present embodiment, the first vehicle 100 includes the self-centering mechanism 400 which biases the front wheel 101 to direct the front wheel 101 toward the front side of the first vehicle 100. Consequently, when the second vehicle 200 is traveling towing the first vehicle 100, it is possible to prevent the front wheel 101 of the first vehicle 100 from vibrating left and right and hindering travel of the second vehicle 200. Furthermore, according to the present embodiment, the upper end part of the front fork 121 is arranged at the back side of the lower end part of the front fork 121 to give the caster angle to the front wheel 101, so that it is possible to enhance straight line stability at when the first vehicle 100 travels forward towing the second vehicle 200. However, when the caster angle is given to the front wheel 101, a force diverting the direction of the front wheel 101 from the front side readily works when the second vehicle 200 travels backward towing the first vehicle 100. When the second vehicle 200 travels backward towing the first vehicle 100 and the direction of the front wheel 101 deviates from the front side, the second vehicle 200 performs cornering unintentionally. According to the present embodiment, the self-centering mechanism 400 is provided, so that it is possible to prevent the second vehicle 200 from performing cornering unintentionally. Furthermore, for example, even a mode that, instead of the self-centering mechanism 400, a manual-type locking mechanism which fixes the direction of the front wheel 101 is provided on the first vehicle 100 can prevent the front wheel 101 from vibrating left and right and hindering travel of the second vehicle 200, and the second vehicle 200 from performing cornering unintentionally. However, the manual-type locking mechanism is likely to cause the passenger DR to neglect operating the locking mechanism. By contrast, according to the present embodiment, the self-centering mechanism 400 automatically turns the direction of the front wheel 101 toward the front side by using the elastic force F2 of the second elastic member 420 and the elastic force F3 of the third elastic member 430. Consequently, the simple configuration makes it possible to automatically prevent the front wheel 101 from vibrating left and right and hindering travel of the second vehicle 200, and the second vehicle 200 from performing cornering unintentionally.

Furthermore, according to the present embodiment, the number of the front wheels 101 provided on the first vehicle 100 is one. Consequently, it is possible to reduce the weight of the first vehicle 100 compared to a mode in which a plurality of front wheels are provided on the first vehicle 100. Therefore, it is possible to reduce power consumption of the second vehicle 200 when the second vehicle 200 travels towing the first vehicle 100.

Furthermore, according to the present embodiment, the second vehicle 200 is provided with the second switches 257 which switch off the electrical connection between the second traveling motors 250 and the second motor drivers 255 when the first vehicle 100 travels towing the second vehicle 200. Consequently, when the first vehicle 100 travels towing the second vehicle 200, it is possible to prevent the regenerative brakes of the second traveling motors 250 from hindering travel of the first vehicle 100. Furthermore, according to the present embodiment, the first vehicle 100 is provided with the first switch 157 which switches off the electrical connection between the first traveling motor 150 and the first motor driver 155 when the second vehicle 200 travels towing the first vehicle 100. Consequently, when the second vehicle 200 travels towing the first vehicle 100, it is possible to prevent a regenerative brake of the first traveling motor 150 from hinder traveling of the second vehicle 200.

B. Second Embodiment

FIG. 9 is a side view illustrating a configuration of a coupler 300b provided on a moving body 50b according to the second embodiment. The moving body 50b according to the second embodiment differs from the first embodiment in that a first elastic member 351b is not a helical compression spring but a helical torsion spring. Other components are the same as those of the first embodiment unless specifically described.

According to the present embodiment, a first support part 352b which supports one end of a first elastic member 351b is provided on the first plate part 311 of a first coupling part 310b. A second support part 353b which supports another end of the first elastic member 351b is provided on the second plate part 321 of a second coupling part 320b. In addition, according to the present embodiment, the first coupling part 310b does not include the first wall part 312 illustrated in FIG. 3, and the second coupling part 320b does not include the second wall part 322 illustrated in FIG. 3.

In the above-described moving body 50b according to the present embodiment, a biasing mechanism 350b separates the rear wheels 102 from the road surface RS when the passenger DR is not on the first vehicle 100 similar to the first embodiment, so that, when the second vehicle 200 travels towing the first vehicle 100 on which the passenger DR is not onboard, it is possible to prevent the friction force applied to the rear wheels 102 from the road surface RS from hindering cornering of the second vehicle 200.

According to the present embodiment in particular, it is possible to miniaturize the coupler 300b in the up-down direction.

C. Other Embodiment (C1) According to the above-described moving bodies 50 and 50b of each embodiment, the first vehicle 100 includes the first traveling motor 150. By contrast, the first vehicle 100 may not include the first traveling motor 150. For example, the first vehicle 100 may be configured as a tricycle which travels when the passenger turns pedals.

(C2) According to the above-described moving bodies 50 and 50b of each embodiment, the first vehicle 100 is configured as an electrically driven vehicle which travels by using the first traveling motor 150, and the second vehicle 200 is configured as an electrically driven vehicle which travels by using the second traveling motors 250. By contrast, at least one of the first vehicle 100 and the second vehicle 200 may be configured as a vehicle which travels by using an internal combustion engine as a power source instead of the electrically driven vehicle.

(C3) According to the above-described moving bodies 50 and 50b of each embodiment, the first vehicle 100 travels by operation of the passenger DR who is on the first vehicle 100. By contrast, the first vehicle 100 may travel without operation of the passenger DR who is on the first vehicle 100. For example, the first vehicle 100 may travel by automatic driving.

(C4) According to the above-described moving bodies 50 and 50b of each embodiment, the first elastic members 351 and 351b of the biasing mechanism 350 and 350b are configured as springs. By contrast, the first elastic members 351 and 351b may be configured as elastic members other than the springs. For example, the first elastic members 351 and 351b may be configured as rubbers or elastomers.

(C5) According to the above-described moving bodies 50 and 50b of each embodiment, the first vehicle 100 is provided with the self-centering mechanism 400 which biases the steering part 120 to direct the front wheel 101 toward the front side of the first vehicle 100. By contrast, the first vehicle 100 may not be provided with the self-centering mechanism 400.

(C6) According to the above-described moving bodies 50 and 50b of each embodiment, the second elastic member 420 and the third elastic member 430 of the self-centering mechanism 400 are configured as springs. By contrast, the second elastic member 420 and the third elastic member 430 may be configured as elastic members other than the springs. For example, the second elastic member 420 and the third elastic member 430 may be configured as rubbers or elastomers.

(C7) According to the above-described moving bodies 50 and 50b of each embodiment, the self-centering mechanism 400 biases the steering part 120 to direct the front wheel 101 toward the front side of the first vehicle 100 by using the second elastic member 420 and the third elastic member 430. By contrast, the self-centering mechanism 400 may urge the steering part 120 to direct the front wheel 101 toward the front side of the first vehicle 100 by using, for example, motors or magnets instead of the elastic members.

(C8) According to the above-described moving bodies 50 and 50b of each embodiment, the first vehicle 100 is provided with the first switch 157 which switches off the electrical connection between the first motor driver 155 and the first traveling motor 150 when the second vehicle 200 is traveling towing the first vehicle 100. By contrast, the first vehicle 100 may not be provided with the first switch 157. In this case, when the second vehicle 200 travels towing the first vehicle 100, the first battery 140 can be charged by regenerative electric power generated by the first traveling motor 150, so that it is possible to achieve a long charge cycle for the first battery 140 by using a power supply provided outside the moving body 50.

(C9) According to the above-described moving bodies 50 and 50b of each embodiment, the second vehicle 200 is provided with the second switches 257 which switch off the electrical connection between the second motor drivers 255 and the second traveling motors 250 when the first vehicle 100 is traveling towing the second vehicle 200. By contrast, the second vehicle 200 may not be provided with the second switches 257. In this case, when the first vehicle 100 travels towing the second vehicle 200, the second batteries 240 can be charged by regenerative electric power generated by the second traveling motors 250, so that it is possible to achieve a long charge cycle for the second batteries 240 by using power supplies provided outside the moving body 50.

(C10) According to the above-described moving bodies 50 and 50b of each embodiment, the second vehicle 200 is configured as an image recognition type unmanned carrier vehicle which detects a traveling route by analyzing images obtained by using the image sensor. By contrast, the second vehicle 200 may be configured as an unmanned carrier vehicle other than the image recognition type unmanned carrier vehicle. For example, the second vehicle 200 may be configured as an electromagnetic guidance type unmanned carrier vehicle, a magnetic guidance type unmanned carrier vehicle or a laser guidance type unmanned carrier vehicle.

The disclosure is not limited to any of the embodiment and its modifications described above but may be implemented by a diversity of configurations without departing from the scope of the disclosure. For example, the technical features of any of the above embodiments and their modifications may be replaced or combined appropriately, in order to solve part or all of the problems described above or in order to achieve part or all of the advantageous effects described above. Any of the technical features may be omitted appropriately unless the technical feature is described as essential in the description hereof. The present disclosure may be implemented by aspects described below.

(1) One aspect of the present disclosure provides a moving body. This moving body includes: a vehicle which includes a front wheel and rear wheels and which a passenger gets on; an unmanned carrier vehicle which is arranged at the back side of the vehicle and includes a wheel and a driving unit which drives the wheel; and a coupler which couples the vehicle and the unmanned carrier vehicle. The coupler includes a biasing mechanism which biases a rear part of the vehicle toward an upper side of the vehicle, the biasing mechanism includes a first elastic member; when the passenger is on the vehicle, the first elastic member is deformed by the weight of the passenger to place the rear wheels in contact with a road surface, and when the passenger is not on the vehicle, the rear wheels are separated from the road surface by the elastic force of the first elastic member.

According to the moving body of this aspect, when the passenger is not on the vehicle, the biasing mechanism separates the rear wheels from the road surface, so that when the unmanned carrier vehicle travels towing the vehicle on which the passenger is not onboard, it is possible to prevent the rear wheels from being applied the friction force from the road surface. Consequently, it is possible to prevent the friction force applied to the rear wheels from the road surface from hindering cornering of the unmanned carrier vehicle. Furthermore, when the passenger is on the vehicle, the biasing mechanism places the rear wheels in contact with the road surface, so that it is possible to stabilize the position of the vehicle when the passenger is on the vehicle.

(2) According to the moving body of the above aspect, the coupler may include a first coupling part which is connected to the vehicle and a second coupling part which is connected to the unmanned carrier vehicle and the first coupling part relatively rotatably about the first coupling part around a rotary shaft along the left-right direction of the vehicle; one end of the first elastic member may be supported by the first coupling part, the other end of the first elastic member may be supported by the second coupling part, and the biasing mechanism may switch between a state where the rear wheels are in contact with the road surface and a state where the rear wheels are apart from the road surface by relatively rotating the second coupling part with respect to the first coupling part by the deformation of the first elastic member.

According to the moving body of this aspect, a simple configuration makes it possible to automatically switch between the state where the rear wheels are in contact with the road surface and the state where the rear wheels are apart from the road surface in response to the passenger getting on and off the vehicle.

(3) According to the moving body of the above aspect, the vehicle may include a steering part which changes the direction of the front wheel, and a self-centering mechanism which biases the steering part to direct the front wheel toward the front side of the vehicle.

According to the moving body of this aspect, when the unmanned carrier vehicle travels towing the vehicle, it is possible to prevent the front wheel from vibrating right and left that hinders travel of the unmanned carrier vehicle.

(4) According to the moving body of the above aspect, the steering part may change the direction of the front wheel by a turning motion of the steering part, and the self-centering mechanism may include a second elastic member which is connected to the steering part and a vehicle body of the vehicle and biases the steering part to turn the steering part, and a third elastic member which is connected to the steering part and the vehicle body and biases the steering part to turn the steering part in a direction opposite to the turning direction by means of the second elastic member.

According to the moving body of this aspect, the simple configuration makes it possible to automatically direct the front wheel toward the front side of the vehicle.

(5) According to the moving body of the above aspect, a number of the front wheel of the vehicle may be one.

According to the moving body of this aspect, it is possible to reduce the weight of the vehicle compared to an aspect where a plurality of front wheels are provided on the vehicle.

(6) According to the moving body of the above aspect, the vehicle may travel by operation of the passenger, the driving unit may be an in-wheel motor which is provided in the wheel, the unmanned carrier vehicle may include a motor driver which drives the in-wheel motor, and a switch which switches on and off the electrical connection between the in-wheel motor and the motor driver, and the switch may switch off the electrical connection between the in-wheel motor and the motor driver when the vehicle is traveling by operation of the passenger.

According to the moving body of this aspect, when the vehicle travels towing the unmanned carrier vehicle by operation of the passenger, it is possible to prevent a regenerative brake of the in-wheel motor of the unmanned carrier vehicle from activating. Consequently, it is possible to prevent the regenerative brake of the in-wheel motor from hindering travel of the vehicle.

The present disclosure can be also realized as various aspects other than the moving body. The present disclosure can be realized as forms such as vehicles and couplers.

What is claimed is:

1. A moving body comprising:
a vehicle that includes one or more front wheels and a plurality of rear wheels;
an unmanned carrier vehicle that includes a wheel and a driving unit, wherein the driving unit drives the wheel; and
a coupler that couples a rear part of the vehicle and a front part of the unmanned carrier vehicle,
wherein the coupler includes a biasing mechanism that biases the rear part of the vehicle toward an upper side of the vehicle,
wherein the biasing mechanism includes a first elastic member, wherein in a state in which a passenger is on the vehicle, the first elastic member is deformed by to place the plurality of rear wheels in contact with a road surface, wherein in a state in which the passenger is not on the vehicle, the first elastic member separates the plurality of rear wheels of the vehicle from the road surface by the elastic force, wherein the coupler includes a first coupling part that is connected to the vehicle, and a second coupling part that is connected to the unmanned carrier vehicle and the first coupling part, the second coupling part is relatively rotatably about the first coupling part around a rotary shaft along a left-right direction of the vehicle, wherein one end of the first elastic member is supported by the first coupling part, wherein another end of the first elastic member is supported by the second coupling part, and wherein the biasing mechanism switches between a state of contacting the plurality of rear wheels with the road surface and a state of apart the plurality of rear wheels from the road surface by relatively rotating the second coupling part with respect to the first coupling part by deformation of the first elastic member.

2. The moving body according to claim 1, wherein the vehicle includes a steering part that changes the direction of the front wheel, and a self-centering mechanism that biases the steering part to direct the front wheel toward a front side of the vehicle.

3. The moving body according to claim 2, wherein the steering part changes the direction of the front wheel by a turning motion of the steering part, and the self-centering mechanism includes a second elastic member and a third elastic member, the second elastic member is connected to the steering part and a vehicle body of the vehicle, the second elastic member biases the steering part to turn the steering part, and the third elastic member is connected to the steering part and the vehicle body, the third elastic member biases the steering part to turn the steering part in a direction opposite to the turning direction of the second elastic member.

4. The moving body according to claim 1, wherein the number of the one or more front wheels of the vehicle is one.

5. The moving body according to claim 1, wherein the vehicle travels by operation of the passenger, the driving unit is an in-wheel motor that is provided in the wheel, the unmanned carrier vehicle includes a motor driver that drives the in-wheel motor, and a switch that switches on and off the electrical connection between the in-wheel motor and the motor driver, and the switch switches off the electrical connection between the in-wheel motor and the motor driver when the vehicle is traveling by operation of the passenger.

* * * * *